Figure 1:
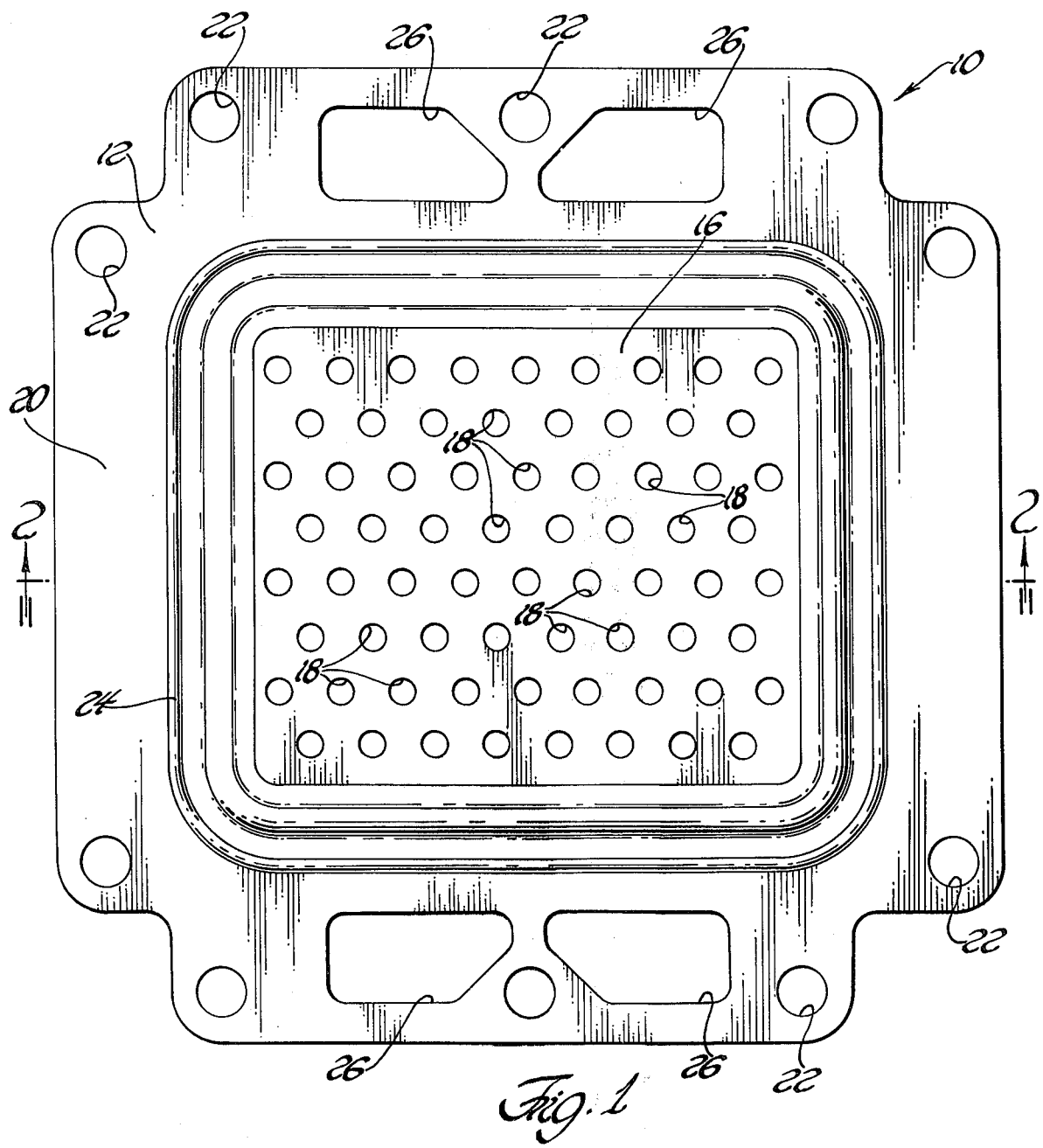

United States Patent [19]

Kargilis

[11] 3,918,422

[45] Nov. 11, 1975

[54] FUEL EVAPORATOR PLATE

[75] Inventor: Alexander Kargilis, Southfield, Mich.

[73] Assignee: McCord Corporation, Detroit, Mich.

[22] Filed: Sept. 24, 1973

[21] Appl. No.: 400,399

[52] U.S. Cl. ................. 123/122 AC; 123/52 MV
[51] Int. Cl.² ........................................ F02M 31/00
[58] Field of Search ..... 123/122 AC, 122 R, 122 A, 123/52 MV, 133; 117/169 R, 130 R, 105.2

[56] References Cited
UNITED STATES PATENTS

| | | | |
|---|---|---|---|
| 2,997,413 | 8/1961 | Wagner | 117/105.2 |
| 3,060,500 | 10/1962 | Spellman | 117/105.2 |
| 3,088,447 | 5/1963 | Henderson | 123/122 R |
| 3,221,719 | 12/1965 | Ulrich | 123/122 R |
| 3,504,963 | 4/1970 | Davies | 117/105.2 |
| 3,625,190 | 12/1971 | Boissevain | 123/122 AC |
| 3,780,715 | 12/1973 | Flitz | 123/122 AC |
| 3,819,384 | 6/1974 | Ingham | 117/105.2 |

*Primary Examiner*—Charles J. Myhre
*Assistant Examiner*—R. H. Lazarus
*Attorney, Agent, or Firm*—McGlynn and Milton

[57] ABSTRACT

This invention relates to a fuel evaporation device including a thermally-conductive plate defining a heat transfer surface adapted to be heated by the exhaust from an internal combustion engine and an evaporation surface, the evaporation surface including a thin layer of porous material, such as aluminum oxide, for defining a network of interconnecting cavities for entrapping, by capillary action, liquid fuel entering the manifold of the engine from the carburetor and for providing a multiplicity of sites for vapor nucleation to reduce the amount of thermal energy required to promote the evaporation process.

8 Claims, 2 Drawing Figures

U.S. Patent  Nov. 11, 1975  3,918,422

FUEL EVAPORATOR PLATE

This invention relates to a fuel evaporator device of the type employed in an internal combustion engine for evaporating liquid fuel as it enters the fuel intake manifold from the carburetor upon cold start-up.

In recent years, the amount of emissions from internal combustion engines has become a serious problem. Therefore, steps are being taken to provide suitable devices for reducing the amount of emissions produced by internal combustion engines. One problem encountered is the large amount of emissions produced when the engine is cold-started. This occurs because unvaporized, liquid fuel is introduced into the manifold, some of which is drawn into the combustion chambers. The unvaporized liquid fuel causes incomplete combustion and, consequently, a relatively large amount of undesirable exhaust emissions, primarily carbon monoxide, is produced. Once the engine is started and has warmed up, the carbon monoxide problem is less acute since the heat of the engine is sufficient to self-vaporize the liquid fuel entering the manifold. However, it has become increasingly important to provide means for efficiently evaporating the liquid fuel during the early stages of engine start-up.

One device, or technique, which has been employed for many years to reduce the amount of emissions, particularly carbon monoxide, during cold starts is the exhaust-heated "hot spot" in the manifold of the engine. The hot spot is effective primarily when the engine is cold-started to evaporate liquid fuel entering the manifold. A typically designed hot spot may include a plate of high thermal conductivity mounted in the manifold directly below the carburetor in the path of the fuel flow. Suitable means are provided for conducting hot exhaust gases from the combustion chambers to one side of the plate. Liquid fuel droplets entering the manifold impinge upon the opposite side of the heated plate and are thereby evaporated. Devices of this general description are known as early fuel evaporation plates, since they function in the early stages of engine start-up to evaporate the liquid fuel.

A number of problems have been encountered in early fuel evaporation plates heretofore known. One of these is the "Liedenfrost" effect which is a well known phenomenon which is observed during evaporation processes. The Liedenfrost effect occurs when the evaporation surface becomes too hot. When a droplet of liquid contacts the evaporation surface, a layer of vapor is immediately formed between the liquid and the surface causing the droplet to jump or pop away from the heated surface and, therefore, prevents efficient evaporation. A common example of the Liedenfrost effect is a drop of water dancing or jumping around in a hot frying pan.

The Leidenfrost effect can be eliminated simply by reducing the temperature of the plate; however, it is well known that the rate of vaporization decreases with decreasing temperature. The temperature problem is further enhanced since the vaporization of a liquid by nucleate boiling requires the presence of small vapor nuclei in the form of bubbles entrapped on the heat transfer surface. The creation and growth of the nuclei on a heat transfer surface requires that the liquid be super heated, that is, the temperature of the liquid must be above the vaporization temperature of the liquid to provide the driving force necessary to generate vapor. To ensure efficient vaporization, the heat transfer surface must be heated above the vaporization temperature; however, raising the temperature of the heat transfer surface to provide the additional heat required promotes the Liedenfrost effect and its attendant disadvantages.

Another problem encountered is that the evaporation surface of the plate must be designed to catch and trap the liquid fuel until it vaporizes. In part, this requirement arises due to the fact that liquid fuel enters the manifold before the engine starts and, therefore, before sufficient exhaust heat is provided to cause evaporation. If this liquid fuel is not held on the evaporation surface, it can run off the plate into the manifold and thereafter enter the combustion chambers before it has vaporized. To solve this problem, upstanding fins or similar structures have been proposed to trap the liquid fuel on the evaporation plate. This solution is undesirable, however, because structures of this type tend to increase the mass of the fuel evaporation plate. Due to the increased mass, the plate holds more heat and, although the liquid fuel is trapped on the evaporation surface, there is a tendency to heat the air entering the manifold. Heating the air is undesirable because the temperature of combustion is increased, thereby producing oxides of nitrogen, another undesirable product of combustion. Furthermore, less air can be introduced into the combustion chambers since hot air is less dense than cold air. Furthermore, increasing the mass of the fuel evaporation plate creates a heat sink which tends to heat up other parts of the engine, such as the carburetor and fuel lines which, in turn, causes vapor lock and other problems. Moreover, the increased mass requires additional time at idle to reach fuel vaporization temperatures. In order to reduce the time required to heat the evaporation plate, fins or other surface extensions are used in the path of the exhaust gas. This, however, further increases the mass of the evaporation plate.

In view of the above, it is the purpose of the instant invention to provide an improved fuel evaporation plate which includes a substantially more efficient evaporation surface. Accordingly, the evaporation surface of the fuel evaporation plate of the instant invention includes a layer of porous material defining a network of interconnecting cavities for entrapping liquid fuel coming in contact therewith and providing a multiplicity of sites for vapor nucleation.

The use of a layer of porous material produces a number of advantages. More specifically, the porous material provides a substantially infinite number of nucleation sites for the formation of vapor bubbles. The ease of formation reduces the differential temperature driving force required and, therefore, reduces the amount of super heat in the surrounding liquid. The temperature of the evaporation surface can thereby be reduced without reducing the rate of vaporization. Since the temperature of the evaporation surface can be reduced, the problem of the Liedenfrost effect is eliminated.

The porous material also catches and collects the liquid fuel entering the manifold. As the liquid fuel impinges upon the evaporation surface, it spreads out and is drawn by capillary action into the minute cavities thereof until it evaporates. This further enhances the efficiency of the fuel evaporation plate and eliminates the use of upstanding fins, or the like, to catch the liquid fuel. Consequently, the mass of the fuel evaporation plate can be reduced because fins, or the like, are no longer needed on the evaporation side of the plate and the need therefor is reduced on the heat transfer side which, coupled with the reduction in temperature, substantially reduces the problem of heating other nearby engine parts and the air passing through the manifold. Additionally, since the evaporation process is more efficient, that is, more liquid fuel is being evaporated, the temperature of the fuel evaporation plate is further reduced because more heat is being drawn off in the form of the heat vaporization.

In summary, the fuel evaporation plate of the instant invention, including a layer of porous material, provides infinite nucleation sites for nucleate boiling, allows the reduction of the mass of the plate, permits the reduction of the operational temperature, thereby eliminating the Liedenfrost effect and other deleterious consequences of higher temperatures, and increases the over-all efficiency of the fuel evaporation plate.

Figure 2:
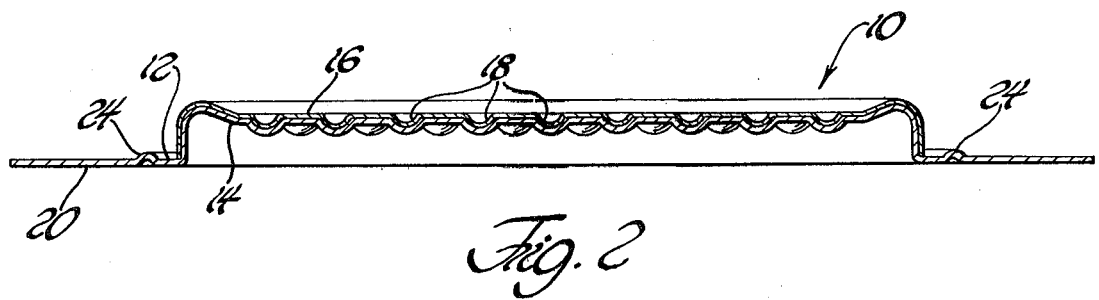

Other features and advantages of the instant invention will be readily appreciated as the same becomes better understood by reference to the following detailed description when considered in connection with the accompanying drawings wherein:

FIG. 1 is a plan view of a preferred embodiment constructed in accordance with the instant invention and FIG. 2 is a cross-sectional view in elevation taken generally along line 2—2 of FIG. 1.

Referring now to the drawings, a fuel evaporator device constructed in accordance with the instant invention is generally shown at 10. The fuel evaporator device 10 includes plate means comprising the plate 12 made of a material having thermal conductivity. In this regard, the plate 12 may be made of stainless steel, copper, or any one of a number of metals which are commonly used.

The plate 12 defines a heat transfer surface 14 on one side thereof which is adapted to be heated by the flow of hot exhaust gases from the combustion chambers of the engine. For this purpose, the engine is provided with a passageway, or chamber, (not shown) below the fuel evaporation plate 12 through which the hot exhaust gases travel and contact the heat transfer surface 14.

The plate 12 also defines an evaporation surface 16 opposite the heat transfer surface 14. The evaporation surface 16 includes porous means comprising a thin layer of porous material which defines a network of interconnecting cavities for entrapping liquid fuel impinging thereon and for providing a multiplicity of sites for vapor nucleation.

The porous material may be formed in any manner wherein the results thereof provides a porous surface capable of withstanding the operating temperatures of the engine and the environment encountered. The preferred embodiment of the instant invention, for example, employs a porous material of aluminum oxide which is bonded to the plate 12 which is made of stainless steel. More specifically, the stainless steel plate 12 is first sand-blasted to create a roughened surface and a bonding coat having a nickel base is applied thereto. Thereafter, a thin layer of aluminum oxide is coated on the surface by flame spraying the molten metal on the plate 12 in an oxidizing atmosphere. It has been found desirable to use the nickel base bonding coat because aluminum oxide applied by the flame spraying process does not adhere to the stainless steel surface as well as it does to the nickel base bonding coat. The nickel base bonding coat, on the other hand, adheres well to the stainless steel surface and the aluminum oxide, in turn, adheres well to the nickel base bonding coat. This procedure is well known in the metal coating and flame spraying art and forms no part of the invention other than illustrating a preferred porous material for use with the fuel evaporation plate of the instant invention.

It is to be noted that other metal oxides may also be used to provide the porous material. For example, the oxides of stainless steel, titanium, copper and other metals may be employed. For economic reasons, it is desirable that the metal used is one which can be flame sprayed onto the surface of the plate 12. Additionally, materials other than metal oxides may be used, such as the common refractory materials which have the required porosity. In any event, the material of the plate 12 is selected not only for its heat transfer properties, but also for its compatibility with the desired porous material and the ability to form a good bond with the porous material.

The plate 12 also includes a number of irregularities 18 in the surface thereof. These irregularities 18 are spherical-shaped members formed integrally with the plate 12 such that projections are produced in the heat transfer surface 14 and depressions are produced in the evaporation surface 16. The irregularities 18 projecting out of the heat transfer surface 14 function to create turbulence in the stream of the exhaust gases passing over it to enhance the heat transfer process. Additionally, the projections increase the total surface area, thereby further aiding the heat transfer process. The depressions created by the irregularities 18 in the evaporation surface 16 cooperate with the porous material to collect liquid fuel as it impinges on the surface thereof. In other words, liquid fuel can pool in the depressions until it has been drawn into the porous material by capillary action.

The fuel evaporation plate 10 also includes a peripheral supporting flange 20 for mounting the plate 12 in the manifold of the engine. For this purpose, the peripheral supporting flange 20 is provided with a plurality of fastener receiving openings 22 for receiving bolts, or the like, the clamp the supporting flange between two members. Additionally, the supporting flange 20 includes a raised sealing bead 24 which is formed integrally therewith to facilitate sealing engagement of the supporting flange 20 with the clamped members. The peripheral sealing flange 20 may also be provided with ports 26 for permitting the closed flow of exhaust from the engine to pass beneath the fuel evaporation plate 10.

In operation, the fuel evaporation plate 10 is mounted in the manifold of the engine so that fuel from the carburetor impinges upon the evaporation surface 16. Suitable passageways are provided from the combustion chamber to conduct hot exhaust gases therefrom to the ports 26 on one side of the plate 12 and out the ports 26 on the other side where it enters the standard exhaust system. As the hot exhaust gases pass beneath the plate 12, heat is transferred to the heat transfer surface 14 which, in turn, heats the evaporation surface 16, including the thin layer of porous material.

Liquid droplets of fuel entering the manifold with the vaporized fuel impinge upon the fuel evaporation plate 10 and are absorbed by capillary action into the interstices of the porous material. As the fuel evaporation surface 16 acquires heat from the exhaust gases, vapor bubbles are formed and the liquid fuel boils or evaporates off the surface thereof. In this regard, it is noted that the porous surface promotes the boiling operation since it provides a substantially infinite number of sites for the nucleation of vapor bubbles. Liquid fuel droplets which enter the manifold before the fuel evaporation plate 10 has heated up, that is, fuel which has entered the manifold during the brief period prior to engine ignition, are trapped in the depressions formed by the irregularities 18 and are absorbed by the porous material until the evaporation surface 16 has acquired sufficient heat to begin the evaporation process. Once the evaporation process begins, the amount of thermal energy required is relatively low because the porous surface provides a multiplicity of nucleation sites, therefore, the heat of the evaporation surface, for efficient evaporation, is well below that required for a "smooth" evaporation surface which provides relatively few nucleation sites. Since the temperature of the evaporation surface is reduced, the deleterious consequences of the Liedenfrost effect is eliminated. Furthermore, since more of the liquid fuel is being evaporated, the temperature of the evaporation surface 16 is reduced as the heat is removed in the form of the heat of vaporization; therefore, the temperature is further prevented from reaching the critical temperature at which the Liedenfrost effect occurs.

The superior ability of the fuel evaporation plate 10 to evaporate and collect liquid fuel allows the mass of the plate 12 to be kept at a minimum. Therefore, due to the low mass of the fuel evaporation plate, it does not act as a heat sink and does not heat up the air passing into the manifold or other nearby parts of the engine to the extent of prior art fuel evaporation devices. In this regard, prior art exhaustheated hot spots have required expensive and elaborate valve systems which shut off the flow of exhaust gas to the hot spot after the engine has heated up sufficiently to self-vaporize in a liquid fuel entering the manifold to prevent the formation of a heat sink. Therefore, as a practical matter, the fuel evaporation plate becomes a liability after approximately the first 20 seconds of engine operation because it is no longer needed to evaporate the liquid fuel and, in the case of prior art devices, becomes a heat sink causing the problems noted hereinbefore. Due to the low mass of the fuel evaporation plate 10 of the instant invention, the amount of heat retained in the plate 12 is relatively low, therefore, it is easily cooled by the flow of fuel into the manifold and does not become a heat sink, thereby eliminating the need for, or at least substantially simplifying the design of, otherwise elaborate and expensive valve systems to re-route the hot exhaust to bypass the fuel evaporation plate 10 after the initial warm-up period. Minimizing the need for heating the entering air fuel mixture allows a greater quantity of heat to be available to warm oxidizing catalysts, if used, which are located in the exhaust stream.

It is also noted that the basic construction of the fuel evaporation plate 10 is relatively inexpensive since it comprises a stamped plate 12 of suitable material, such as stainless steel, which is provided with fastener receiving openings 22, the sealing bead 24, and the ports 26 and is thereafter coated with the porous material. The construction of the fuel evaporation plate 10, therefore, eliminates expensive and time-consuming operations such as welding, assembly, and other fabricating operations. Moreover, the porous coating is metallurgically bonded to the plate 12 to form, in essence, an integral construction which avoids the problem of components being separable and the attendant disadvantages thereof.

While a specific form of the invention has been illustrated and described in the foregoing specification and accompanying drawings, it is to be understood that the invention is not limited to the exact construction shown, but that various alternatives in the construction and arrangement of parts will become apparent to those skilled in the art without departing from the scope and spirit of the invention as defined in the depending claims.

The embodiments of the invention in which an exclusive property or privilege is claimed are defined as follows:

1. A fuel evaporation device to be disposed in the fuel/air mixture path between a carburetor and intake manifold of an internal combustion engine and in heat transfer relationship with the hot exhaust gases thereof, said device comprising: a thermally-conductive plate member including a heat transfer surface and an evaporation surface, said plate member including mounting means for mounting said plate member with said heat transfer surface in heat transfer relationship with the hot exhaust gases, said evaporation surface including a layer of porous material defining a network of fluidly interconnected cavities for providing a multiplicity of sites for vapor nucleation whereby the liquid fuel impinges upon the evaporation surface and is drawn by capillary action into said network of fluidly interconnected cavities until it evaporates.

2. A device as set forth in claim 1 wherein said porous means includes a layer of porous metal oxide.

3. A device as set forth in claim 1 wherein said plate means includes a plurality of irregularities simultaneously defining turbulence-producing projections on said heat transfer surface and fluid collecting depressions on said evaporation surface.

4. A device as set forth in claim 3 wherein said irregularities comprise spherical members formed integrally with said plate means.

5. A device as set forth in claim 3 wherein said mounting means includes a peripheral supporting flange.

6. A device as set forth in claim 5 wherein said pheripheral supporting flange includes a sealing bead for sealing said flange between two members.

7. A device as set forth in claim 5 wherein said peripheral flange includes port means for passage of a heat medium across said heat transfer surface.

8. A device as set forth in claim 5 wherein said peripheral flange includes fastener receiving apertures.

* * * * *